US011178541B2

(12) United States Patent
Lekutai

(10) Patent No.: US 11,178,541 B2
(45) Date of Patent: Nov. 16, 2021

(54) ADDRESS RETRIEVAL SYSTEMS AND METHODS

(71) Applicant: T-Mobile USA, Inc., Bellevue, WA (US)

(72) Inventor: Gaviphat Lekutai, Kirkland, WA (US)

(73) Assignee: T-MOBILE USA, INC., Bellevue, WA (US)

( * ) Notice: Subject to any disclaimer, the term of this patent is extended or adjusted under 35 U.S.C. 154(b) by 114 days.

(21) Appl. No.: 16/452,377

(22) Filed: Jun. 25, 2019

(65) Prior Publication Data

US 2020/0413252 A1 Dec. 31, 2020

(51) Int. Cl.
*H04W 12/02* (2009.01)
*H04W 8/20* (2009.01)
*H04W 8/04* (2009.01)
*H04W 4/029* (2018.01)

(52) U.S. Cl.
CPC .......... *H04W 12/02* (2013.01); *H04W 4/029* (2018.02); *H04W 8/04* (2013.01); *H04W 8/205* (2013.01)

(58) Field of Classification Search
CPC ....... H04W 12/02; H04W 4/029; H04W 8/04; H04W 8/205
USPC .......................................................... 726/1
See application file for complete search history.

(56) References Cited

U.S. PATENT DOCUMENTS

| 7,054,615 B2* | 5/2006 | Evensen | ................. H04W 8/16 455/410 |
| 7,162,365 B2 | 1/2007 | Clapper | |
| 2005/0259658 A1 | 11/2005 | Logan et al. | |
| 2008/0147435 A1* | 6/2008 | Hariri | ................... H04M 3/465 705/317 |
| 2014/0075580 A1* | 3/2014 | Santosh | .................... G06F 9/54 726/30 |
| 2014/0223511 A1* | 8/2014 | Yamamoto | .............. H04L 63/08 726/3 |
| 2015/0024720 A1* | 1/2015 | Efrati | .................... H04W 12/08 455/414.1 |
| 2016/0125358 A1* | 5/2016 | Kushner | ............ G06Q 10/0835 705/337 |

OTHER PUBLICATIONS

Zugenmaier et al., "Privacy in Electronic Communications", IEEE, doi: 10.1002/9780470099742.ch24, 2007, pp. 419-440. (Year: 2007).*

(Continued)

*Primary Examiner* — Peter G Shaw
(74) *Attorney, Agent, or Firm* — Lane Powell PC

(57) ABSTRACT

An address retrieval system that retrieves the physical address of a user based on a request from another user. The address retrieval system can be connected to a network, such as a cellphone network, to allow a user to submit a request containing personally identifiable information, such as a phone number, of another user and the address retrieval system can locate/retrieve the requested address information and return the information to the requesting user or a third party. The release of the address information can be managed by a user-configurable privacy policy that provides rules, permissions and/or other management regarding the release of the user's address information.

21 Claims, 5 Drawing Sheets

(56) References Cited

OTHER PUBLICATIONS

Alshehri et al., "A Holistic Framework for Enhancing Privacy Awareness", IEEE, doi: 10.1109/NCG.2018.8592972, 2018, pp. 1-6. (Year: 2018).*
Sanches et al., "Knowing your Population: Privacy-Sensitive Mining of Massive Data", Canadian Center of Science and Education, ISSN 1927-064X, Jan. 23, 2013, pp. 34-51. (Year: 2013).*
Boulos et al., "Musings on Privacy Issues in Health Research involving Disaggregate Geographic Data about Individuals", PubMed Central Publication, ISSN 1476-072X, Jul. 20, 2009, pp. 1-9. (Year: 2009).*

* cited by examiner

ADDRESS RETRIEVAL SYSTEMS AND METHODS

BACKGROUND

In the current digital age, more and more interpersonal communications are performed in the electronic rather than the physical realm. In years past, people wanted to know another person's home phone number and/or the person's physical address so they could correspond with one another. Now, a person's cellphone number and email address are two pieces of personal information often used for interpersonal communication. Knowing a person's cellphone number, email address and/or other electronic identities are valuable knowledge when someone wishes to communicate with another electronically. However, when a person wishes to send a physical item to another, the person may find themselves at a loss for a physical address to which to send the item. A person wishing to send a physical item to another can contact the other person for an address; however, it can take time for the other person to respond to the request and/or can ruin a surprise someone is planning, such as sending a gift. Since many people know the electronic contact information of the others to whom they wish to send items, such as business contacts, friends and family, it would be helpful if there were systems and/or methods in which a user could more easily facilitate sending items.

DETAILED DESCRIPTION

Figure 1:
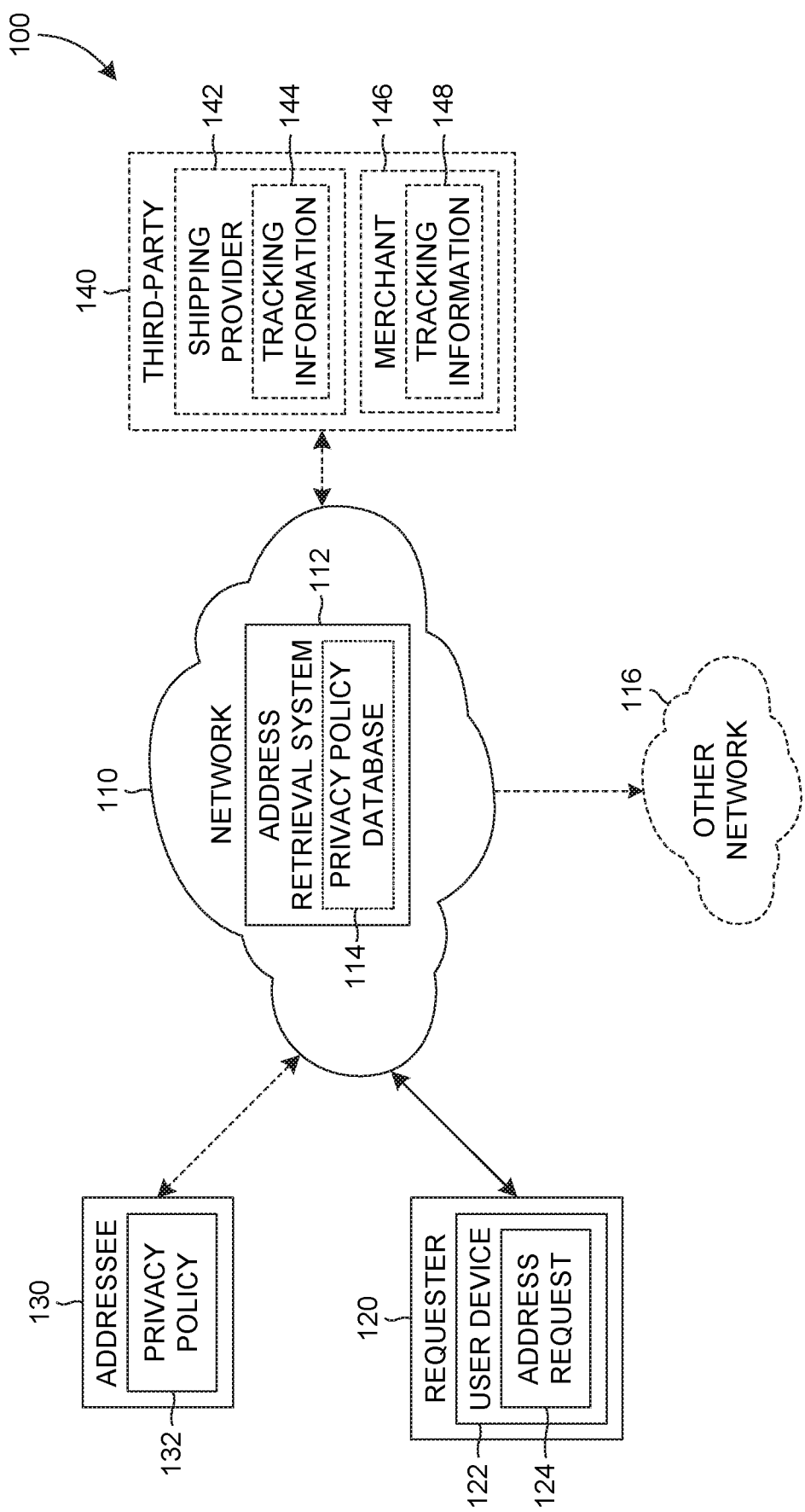
FIG. 1 illustrates an example interaction with an address retrieval system.

Described herein are systems and methods for retrieving a physical address of a user of/on a network, such as a cellular telephone network, in response to a received request from another user of the same or another network. The requesting user may wish to send a physical item to the user, an addressee, however, the requester may not have an address for the addressee. The requester can request the addressee of the user using the systems and/or methods described to retrieve a physical address of the addressee so that the physical item may be properly addressed. The requester and addressee can be members/subscribers of the same network, such as subscribers of the same cellular network/provider. Alternatively, the requester and the addressee may be members of different networks, such as different cellphone providers. To allow the requester to retrieve an address of the addressee, the address retrieval systems and/or methods can include a relationship between the two networks to allow the request of one network to be fulfilled by another network.

One or more privacy policies are applied in response to the request and can provide rules, permission, or otherwise manage the release of the address information, including preventing/denying the release of the address information. The privacy policy is a user-configurable/customizable set of permissions/rules that the user can edit, modify, and/or apply to manage the release of their address information using the address retrieval systems and/or methods. The privacy policy(s) can be stored in, or accessible to, the address retrieval system, such as in a database(s) of the address retrieval system or a database(s) accessible to the address retrieval system. A user can interact with a user device, such as a cellphone, tablet, or computer, to configure or apply their privacy policy regarding the release of their address information. Additionally, the address retrieval systems and/or methods can include a default privacy policy that is applied to users who have not configured or applied a privacy policy. The default privacy can provide a high level of privacy/security, such as denying release of the user's address information, so that the user's privacy is maintained without the user's intervention.

The requesting user, a requester, can generate a request for the physical address of another user, who is the addressee. The request can be generated by the requester by interacting with a user device, such as a cellphone, tablet, or other device capable of communicating with an address retrieval system of a network associated with the user device. The requester can also interact with the address retrieval system through a webpage/portal that can communicate with the address retrieval system. The requester can include at least a piece of personally identifiable information associated with the addresses. The personally identifiable information can be in the possession of and/or accessible by the requester for inclusion in the request. Example personally identifiable information can include a phone number, email address, social media username, name, or other substantially unique information associated with the addressee. The address retrieval system can receive and process the request. A query can be generated by the address retrieval system and can include the necessary information for retrieving the addressee's physical address from a network node. The query can also include various permissions and/or features that assist the network node in interpreting and/or processing the query, such as applying a privacy policy associated with the user/addressee of the address information be requested. The network node can include information associated with the addressee, including a physical address and one or more pieces of personally identifiable information. The network node can use the personally identifiable information of the query to retrieve the physical address information of the associated user, the addressee. The retrieved address information can then be transmitted back to the requester or to another party, such as a third party designated by the requester, like a shipping service and/or merchant.

The addressee can have one or more associated privacy policies that the addressee can configure to establish various limits, permissions and/or management regarding the release/transmission of the addressee's physical address information by the address retrieval system. The privacy policy can be implemented/applied by the address retrieval system to one or more of the query or the transmission of the physical address information. Using the privacy policy, the addressee can be provided tools to allow the addressee to limit/restrict the release of physical address information, which can be a security/privacy concern of the addressee and/or other users of the network which the address retrieval system is on or accessible by. Additionally, the privacy policy can be configured to cause a notification to be sent to the addressee, such as to a user device associated with the addressee, when a request for the addressee's physical address information is received and/or during processing of such a request.

In an example, the privacy policy of the addressee can be configured to require that the addressee provide permission for each release of their address information, such as by responding to a notification of the address retrieval request. In another example, the addressee can configure the privacy policy to require that the addressee and requester be mutual contacts, which can cause the address retrieval system to query the contacts associated with both the addressee and the requester to determine if they are mutual contacts. In yet another example, the addressee can configure the privacy policy to restrict transmission of the addressee's address information to only third parties, such as an online merchant or shipping service. This restriction can prevent the requester from receiving/viewing the addressee's information, while still allowing the requester to have an item shipped to the addressee.

In some situations, the requester and the addressee may be users of different networks, such as users of different cellphone networks/providers. The query, based on the request, can be structured or can include a feature(s), such as permissions/encoding, to allow the query of a user of one network to retrieve the address information associated with a user of another network. The privacy policy associated with the addressee can be on the requester's network or can be retrieved from the network associated with the addressee. Alternatively, a central repository/database of various users and their associated privacy policy(s) can be accessible to the address retrieval system to allow the address retrieval system to implement the appropriate privacy policy for each request.

Alternatively, or additionally, the privacy policy(s) of a user can be stored on an associated user device of the user and the address retrieval system can query/communicate with the user device to receive the appropriate privacy policy. A default action, such as a denial of release of the address information, can be applied by the address retrieval system when the system fails to, or experiences errors in, the retrieval of the privacy policy from the user device. In another embodiment, a user's privacy policy(s) can be duplicated or distributed across one or more locations accessible by the address retrieval system, such as a database of the address retrieval system, a database on a network accessible to the address retrieval system, a user device accessible to the address retrieval system, and/or other systems, devices and/or locations accessible to the address retrieval system.

The retrieved address information can be provided/transmitted to one or more third parties, such as a shipping service or merchant. The third party can be engaged by the requester to send an item to the addressee and the requester can use the address retrieval system to retrieve the necessary address information of the addressee. As part of the request, the requester can designate a third party to receive the retrieved address information. In another embodiment, the third party can generate/communicate the request on behalf of the requester, such as during the checkout process of an online merchant that the requester engages to send the purchased item to the addressee. In another embodiment, the privacy policy associated with the addressee can limit/restrict the recipient(s) of the retrieved address information to a third party, which can prevent the requester from actually viewing/receiving the address information of the addressee or any portion thereof.

The various address retrieval systems and/or methods include various configurable settings to deny, limit/restrict, and/or allow the address information provided by the address retrieval systems and methods and/or the recipients allowed to receive the address information from the address retrieval systems and/or methods.

FIG. 1 illustrates an example interaction 100 with an address retrieval system. The interaction 100 includes a network 110 having the address retrieval system 112, a requester 120 that uses a user device 122 to request an address 124, an addressee 130 having a privacy policy 132 regarding the release of their address information, and optionally, a third party 140 that can receive the address of the addressee 130. The requester 120 can provide the request 124, containing information regarding the addressee 130, to the address retrieval system 112. The request 124 can contain identifying information regarding the addressee 130, such as their cellular or other phone number. The address retrieval system 112 can then provide the requested address information, based on the privacy policy 132 of the addressee 130, back to the requester 120 or to a third party 140.

The network 110 can be a network accessible by the requester 120 through their user device 122, such as a cellular telephone network. Such a network 110 can contain information regarding multiple users, including a telephone number and physical address associated with each user of the network. The address retrieval system 112 can access this information to retrieve an address associated with a user and can return that address to the requester 120, a third party 140, or not, in accordance with the privacy policy 132 of the addressee 130.

In an example, the network 110 can be a cellular telephone network, such as the network of a carrier, and the requester 120 and/or addressee 130 can be users of the network 110. As users of the network 110, the network has various information associated with each and that information can be accessible to the address retrieval system 112. Alternatively, or additionally, the network 110 can include a network node or other network feature, element and/or system that is accessible by, and/or integrated with, the address retrieval system 112 to retrieve address information associated with the addressee 130. This network node can be populated with some or all of the addressee 130 information contained on, by, and/or accessible to the network 110, such as a physical address of the addressee 130 and a piece of personally identifiable information, such as a telephone number.

In another embodiment, the requester 120 and addressee 130 may be on, or members of, different networks, such as different cellular providers/carriers 116. The address retrieval system 112 of the requester's network 110 can contact, or query, the other network 116 to receive the address information of the addressee 130, who is a member of, or is on, the other network 116. Various interfaces, hardware and/or software, such as existing inter-network interfaces, can be used to allow the network 110 to communicate with and/or receive information from the other network 116. In another example, addressee/user information of/on other network 116 can be stored on a node/database of network 110, such as discussed above, or can be on a network node accessible to the address retrieval system 112. In this way, the address retrieval system 112 can access and retrieve the address of an addressee regardless of the network of which the addressee is a member, or is connected.

To request an address, the requester 120 can interact with a user device 122 to create and/or transmit an address request 124. An application or other interface, such as a website, on or accessible to the user device 122 can be used to generate/transmit the address request 124. In an example, the user device 122 can be a mobile device, such as a telephone, on which the requester 120 has various contact information stored. Example contact information can include a phone number, a name, social media identification, email, and/or other information of/regarding the various contacts of the user device 122. To prepare the address request 124, the requester 120 can select a piece of user information they have, such as contact information, regarding the addressee 130 for which they are seeking to retrieve address information. This information regarding the addressee 130, such as a phone number of the addressee, can be included in the address request 124 and can be used by the address retrieval system 112 to retrieve, identify and/or locate the physical address information of the addressee for which the request 124 has been submitted. Once the address retrieval system 112 has retrieved the physical address information of the addressee 130 based on the request 124, the address retrieval system 112 can transmit/provide that information to the requester 120, such as through the user device 122, and/or can provide the information to a third party 140.

In an example, the requester 120 may wish to send a physical item to the addressee 130, but they may lack a physical address to which to send the item. The requester 120 can then submit an address request 124 to the address retrieval system 112 to receive a physical address for/associated with the addressee 130. The requester can then use the retrieved address to properly address the item to the addressee 130.

In another example, the address request 124 can be part of/included in the checkout process of purchasing the item, such as the checkout process of an online store. As part of the checkout process, the requester 120 can generate/transmit an address request 124, such as through the actual checkout process of the online retailer, a separate process on the user device 122, or through another process/interface. The requester 120 can then receive the physical address information of the addressee 130 from the address retrieval system 112 and can then provide the physical address information to the online retailer as an address to which the purchase is to be shipped. In another embodiment, the address retrieval system 112 can provide the physical address information directly to the online retailer, an example third party 140, and/or their shipping service/partner. In this manner, the requester 120 does not actually need, and may be prevented from viewing/receiving, the physical address information of the addressee 130.

The addressee 130 can set up/configure a privacy policy 132 that provides rules/limitations on the release of their address information by the address retrieval system 112. The privacy policy 132 can have one or more options to allow the addressee 130 to govern the release of their information by the address retrieval system 112. In an example, the privacy policy 132 can require that the address retrieval system 112 to inform the addressee 130 about an address request 124 and can also allow the addressee 130 to optionally require that the addressee 130 give permission before the address information is released to the requester 120 and/or a third party 140.

The privacy policy 132 of the addressee 130 can be stored on the network 110 and/or the address retrieval system 112. Each time the addressee's physical address is requested, the address retrieval system 112 can access the privacy policy 132 of the addressee 130 to determine if/how to release the requested address information. In an embodiment, the privacy policy 132 can be part of a user profile of the addressee 130 on the network 110 and/or can modify the user profile, or other physical address containing record, of the addressee so as to obscure from/prevent the address retrieval system 112 from retrieving the address information of the addressee 130. In embodiments in which the addressee information is stored at/on a location other than the network 110, the privacy policy 132 can be accessed and/or applied to the addressee's 130 information to manage the release of such information.

The address retrieval system 112 can include a privacy policy database 114 that can store privacy policy(s) 132 associated with one or more addressees 130. The address retrieval system 112 can retrieve an appropriate privacy policy from the privacy policy database 114 based on the address request 124. In another example, the privacy policy(s) 132 of the addressee 130 can be stored in another location(s) accessible by the address retrieval system 112, such as a database of the network 110 or 116, on a user device of the addressee 130 and/or other database/storage accessible to/by the address retrieval system 112.

One or more third parties 140 can receive the addressee's 130 physical address information from the network 110/address retrieval system 112. As discussed, an instruction to send the retrieved address information to a third party 140 can be included in the address request 124. Alternatively, as part of the privacy policy 132, the addressee 130 can provide permission that their information is allowed to be shared with a third party 140 in response to an address request 124. In such an example, the privacy policy 132 can allow the address information to also be sent to the requester 120 or can specify that the address information is not allowed to be provided to a requester 120, but rather only to a third party 140 so as to prevent the requester 120 from actually receiving the address information of the addressee 130.

In an example, the requester 120 may wish to send a package to a friend, the addressee 130 and the requester 120 can lack the necessary address information to address the package properly. To send the package, the requester 120 can contract a shipping provider 142 and the requester 120 can request 124 the addressee's 130 address information from/using the address retrieval system 112. As part of the request 124 and/or the privacy policy 132 of the addressee 130, the retrieved address information can be provided directly to the shipping provider 142 by the address retrieval system 112, while the requester 120 does not receive/view the retrieved address information. In this example, there is no need of the requester 120 to have/view the retrieved address information since the only party that requires the information is the shipping provider 142 so that they may properly address and/or ship/deliver the package. In this manner the addressee's 130 address information is maintained as private and restricted to only the party(s) who require the information.

In another example, a business may wish to send a package/item to an addressee 130, such as for purposes of the business or at the request of another person, like a gift purchased for the addressee 130 from the business. The business can request an address of the addressee 130 using the address retrieval system 112. The addressee's 130 privacy policy 132 can allow the release of address information to businesses, such as based on an assumption by the addressee 130 that a request for address information from a business is legitimate and does not violate the privacy and/or endanger the security of the addressee 130. The address retrieval system 112 can provide the business the addressee's 130 address information, in accordance with the privacy policy 132, allowing the business to properly address and/or send the package to the addressee 130. Additionally, as part of the privacy policy 132, the addressee 130 can require an input regarding the nature of the item to be sent to the addressee 130, such as advertisement material, a gift and/or other categories/classifications of the item. The addressee 130 can configure the privacy policy 132 to restrict the retrieval or transmission of the address information based on the categorization/classification of the item to be sent, such as to prevent unwanted advertisement materials from being sent to the addressee 130 by denying access to the address information by parties intending to send such materials.

Example third parties 140 can include shipping providers/ services 142, merchants 146 and/or other parties that a requester 120 might engage to send a physical item to the addressee 130. In an example, the requester 120 can engage a shipping provider 142, such as a home delivery service, to send an item to the addressee 130. To properly address the item, the shipping provider 142 will require the physical address of the addressee 130. The requester 120 can send an address request 124 to the address retrieval system 112 to either receive the address of the addressee 130 and/or have the address retrieval system 112/network 110 provide the address to the shipping provider 142. As part of their service, the shipping provider 142 may provide tracking 144 of the shipment. The tracking information 144 for the shipment/ delivery can be provided to the requester 120 and/or the addressee 130. As part of the privacy policy 132, the release of the tracking information 144 to the requester 120 may be optionally controlled/configured by the addressee 130.

Similarly, a requester 120 can make a purchase from a merchant 146 and request that the purchase be sent to the addressee 130 for whom they do not have complete and/or proper address information. As part of the merchant's 146 checkout process or as an interface between the address retrieval system 112 and the merchant 146, the requester 120 can transmit an address request 124 to retrieve address information for the addressee 130. The retrieved address information can be provided to the merchant 146 to complete the required address information to have the purchase delivered to the addressee 130. Additionally, the merchant 146 can provide tracking information 148 to allow the delivery to be tracked. The privacy policy 132 of the addressee 130 can govern the release of the tracking information 148 to the requester 120, either in its entirety or some portion thereof.

Figure 2:
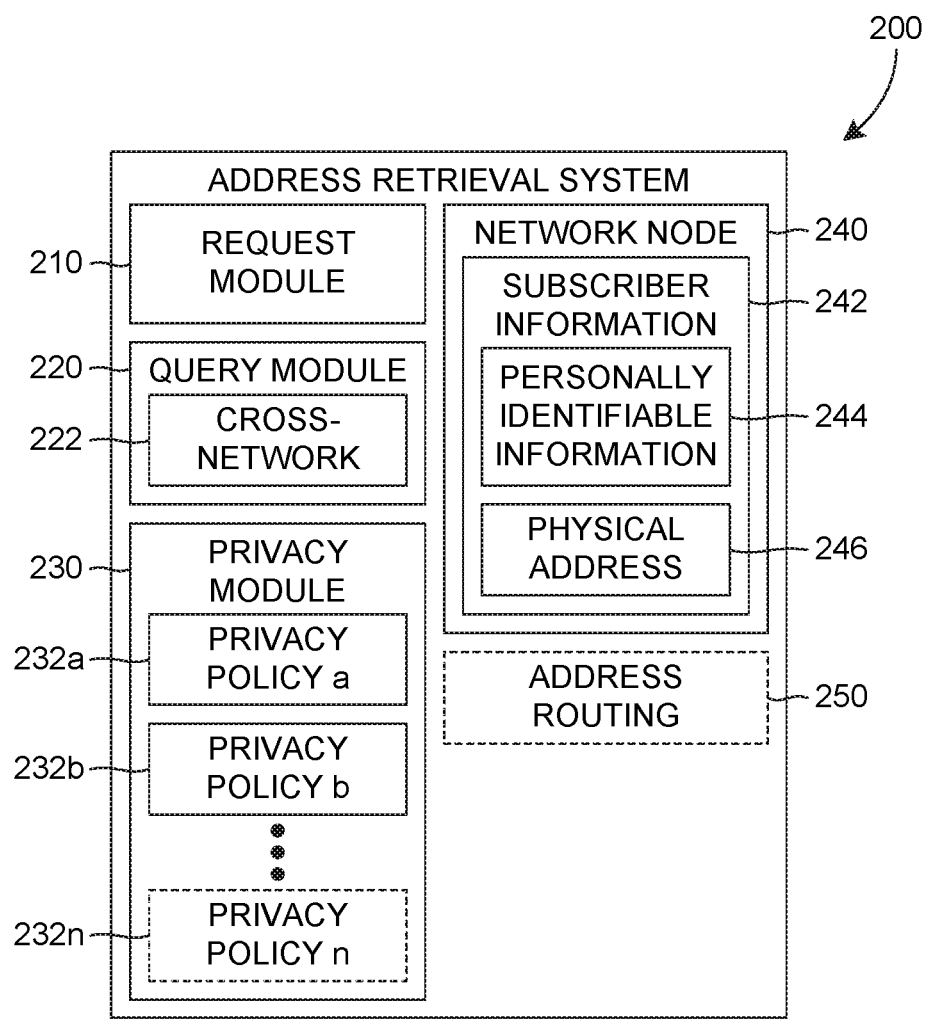
FIG. 2 illustrates an example address retrieval system.

FIG. 2 illustrates an example address retrieval system 200 that includes a request module 210, a query module 220, a privacy module 230, a network node 240, and, optionally, address routing 250. The various features and/or processes described with respect to each of the elements of the address retrieval system 200 can be included in, performed by, integrated within and/or distributed amongst one or more elements of the address retrieval system 200. The address retrieval system 200 receives/processes a request for an address and then provides the address, if permitted, to a requester of the address or another party. The address information can be stored on a network/network node 240 of, or in communication with, the address retrieval system 200. To prevent misuse and/or unwanted distribution of address information, the privacy module 230 can apply/ consult one or more privacy policies to determine the rules and/or conditions for release of the addressee's information. Once retrieved, the address can be transmitted to the requester and/or another party based on the address routing 250.

The request module 210 receives an incoming request for address information from a requester. The incoming request can be received from a user device of the requester and/or through another portal/interface in communication with the address retrieval system 200. In an example, the request can be received from another system, such as a merchant or shipping service engaged by the requester to send a physical item to an addressee for whom the address information is being requested. Included in the request is at least a piece of personally identifiable information 244 of the addressee, such personally identifiable information 244 can include a phone number, name, username, email address and/or other information/identification associated with the addressee. This information can be parsed/extracted from the request and used to retrieve the address information of the addressee.

Additional information can also be included in the request, such as an identification of the requester, a location of the requester, an identification of the device through which the request was submitted, a time of the request and/or other information regarding the submitted request. In an example, the request can also include an indication whether a contacts list of the requester includes a contact having the personally identifiable information 244 of the addressee that the user is submitting with the request. This verification of the contact relationship between the requester and addressee can also include an indication of the length of time the contact has been included in the requester's contact list, the date of creation of the contact within the requester's contact list, whether the contact is listed or has characteristics of being a personal contact compared to a business contact, and the like Such verification can assist with determining the validity/legitimacy of the request and assist with preventing abuse/fraud of the address retrieval system 200.

The query module 220 can generate a query for the requested address information based on the received request. The query can be used by the network node 240 to retrieve the requested address information and can include instructions/controls for release of the address information based on a privacy policy of the privacy module 230. Included in the query can be a destination(s) to which the address information will be transmitted, such as back to the requester and/or to another party. The query can also include permissions, formatting and/or instructions to allow the request to be transmitted to another network 222 that contains or has access to the address information of the addressee. In an example, the requester can access the address retrieval system 200 through their own cellular carrier network; however, the requested address information may be for an addressee that is on another cellular carrier network. As such, the requester's cellular network may not contain/have access to the address information of the addressee, such as to a user profile of the addressee that contains a physical address of the addressee. The query module 220 can include cross-network 222 capabilities and can structure or include in the query the necessary elements/features to allow the query to be received and processed by the addressee's carrier network so that the request may be completed.

The privacy module 230 can store, apply/implement and/or manage one or more privacy policies 232a-232n, with one or more of the privacy policies 232a-232n being associated with the addressee or user of the address retrieval system 200. The privacy module 230 can apply/implement a privacy policy 232a-232n at one or more points/times during the process of address retrieval. The privacy policies 232a-232n are configurable by a user, such as a member/ subscriber of the network to which the address retrieval system 200 belongs and/or can access. The user can establish/configure various rules/permissions regarding the release of their address information. These rules/permissions can set limitations regarding the release of the address information, such as preventing the release of any information, requiring a permission of the user before releasing the information, allowing the release of information, establishing one or more parties to which the information can be released and/or other rules, procedures and/or policies outlining/defining how the user's address information can be released/transmitted by the address retrieval system 200.

An initial/default privacy policy can be globally implemented for all addressees, such as an automatic denial of the address request or preventing the address information of the addressee to be supplied. This initial/default privacy policy can remain until a user takes the active step of modifying/configuring the privacy policy(s) associated with themselves. In this manner, address information for users/addressees is prevented from being provided/shared as a default, which maintains the maximum privacy available to the user/addressee without them having to set up or configure a privacy policy.

Additionally, a user may have one or more associated addresses in the network node 240, and/or other networks, and the address retrieval system 200 can allow the user to configure their privacy policy to release one or more of the available addresses and/or configure a privacy policy associated with the each of the available addresses. In this manner, the user can configure rules/permissions that manage the release of one or more of their addresses. For example, a user can have a work address and a home address available for retrieval by the address retrieval system 200. The user can configure a privacy policy, or a policy associated with each/one or more of their addresses, to release one or the other, or both, addresses based on the request, such as based on the personally identifiable information supplied in the request and/or other information included in, and/or associated with, the request. In the example, the user can configure their privacy policy to supply their work address when the request includes their work phone number as the piece of personally identifiable information 244 and to supply their home address when the request includes their home phone number as the piece of personally identifiable information 244. In another example, the user could set a privacy policy in which the user's work address is transmitted when either of the user's personal or business telephone numbers are included in the request. A user's privacy policy could restrict access to one or the other of the user's personal or business address, depending on the user's preferences.

Additionally, the user can also configure multiple privacy policy or subsets/tiers of their privacy policy, such as based on the personally identifiable information 244 provided in the request. For example, the user's privacy policy(s) can include requirements that if certain, or a particular combination of, personally identifiable information 244 is supplied in the request, then apply a first privacy policy or a first subset of a privacy policy and if another/different type of personally identifiable information 244, or combination thereof, is supplied, then apply a second privacy policy or a second subset of a privacy policy. Allowing a user to structure/configure their privacy policy(s) in this manner can allow them to give permission/set restrictions on the release of their address information based on the information supplied in the request. In an example, a user may give out or have public a phone number associated with their work and can configure their privacy policy to deny/prevent the release of their address information when the request includes their work phone number. That same user can also have a home phone number that is less well-known so they may feel comfortable with allowing their address information to be provided only to people who include the user's home phone number in the request or who are listed as a personal contact in the user's device.

The privacy module 230 can retrieve and/or apply a user's privacy policy prior to retrieval of the address information, prior to transmitting the retrieved address information and/or at another time/point during the address retrieval process. In an example, to apply a privacy policy prior to the retrieval of the address information, the user's privacy policy can include one or more elements of personally identifiable information 244 associated with the user. The personally identifiable information 244 of the submitted request can be used to identify, locate and/or retrieve a privacy policy based on a correlation, or match, between the personally identifiable information 244 of the request and the personally identifiable information 244 associated with a privacy policy. The privacy module 230 can then apply the appropriate privacy policy to the query, such as denying the query to be used to retrieve address information due to a violation of the privacy policy, limiting/modifying the recipients of the address information once retrieved, other modifications/limitations of the query, allow the query to proceed with no modifications and/or request permission of the addressee to allow release of their address information.

In another example, the privacy module 230 can apply/implement a user's privacy policy after the user's address information has been retrieved. The retrieved address information, or other information regarding the addressee, retrieved or supplied as part of the request, can be used by the privacy module 230 to locate and/or retrieve a privacy policy associated with the addressee. The privacy module 230 can then apply/implement the privacy policy of the addressee, such as verifying the recipient(s) of the address information comply with the privacy policy, modifying the recipients or the retrieved address information based on the privacy policy, confirming or denying the release of the retrieved address information, request permission of the addressee prior to releasing the retrieved address information and/or other handling of the retrieved address information.

As part of the privacy policy, or by default in the absence of a user-instructed privacy policy, the privacy module 230 can cause a notification to be sent to the addressee—the user whose address information was retrieved—requesting the addressee's permission to release their address information. The notification can be transmitted to a device, such as a mobile phone, or communication platform, such as email, that is associated with the addressee. The addressee can view the notification, which can include information regarding the requester, such as their name, location, a photo, a social media identification associated with the requester and/or other information regarding the requester. This information regarding the requester can be supplied by the requesting user, retrieved from a database correlating the requester and information regarding the requester, from the network node 240 or other network/network location and/or from other sources accessible by or capable of providing input to the address retrieval system 200. Such information regarding the requester can assist the addressee in evaluating whether to release their address information to the requester or to another recipient designated by the requester, such as a third party. The notification can include a means for the addressee to provide their permission, such as an icon/link to select or a response to provide, to allow or not allow their address information to be released. In an example, the notification can be received by the addressee as a text message or notification on their cell phone. The addressee can then view information about the request in the notification, which can also include selectable links to view further information of the requester such as a social media profile of the requester, and can provide their permission by interacting with/responding to the notification. Once the addressee indicates/confirms their permission to release the address information, the privacy module can allow the retrieved address information to be released to the recipients designated in the request.

As part of the notification, the addressee can also be presented an opportunity to verify and/or edit the retrieved address information. In this manner, the addressee can provide a more suitable/preferred address for the recipient to send an item to and/or correct errors in the retrieved address information. If the addressee modifies the retrieved address information, they can also be queried if they would like the address information accessible to the address retrieval system 200 to be updated to include the modified, or new, address information. In the example of a cell phone network having the address retrieval system 200, confirmation by the addressee to update their address information can cause that modification/edit to be populated to their subscriber information associated with the cell phone carrier/network, such as updating a billing or home address associated with the addressee.

The notification can also include contact information for the requester and/or a selectable means of establishing a communication session with the requester. This can allow the addressee to contact and/or communicate with the requester, such as through a phone call, text message or chat session. The addressee can use the session to acquire further information from the requester, verify the requester and/or otherwise communicate with the requester prior to providing or denying permission for the retrieved, or requested, address information to be released to the recipient(s) of the request.

The network node 240 can include subscriber information 242, such as personally identifiable information 244 and physical addresses 246. The subscriber information 242 can be information regarding users of the network, such as user's whose addresses may be requested, i.e. potential addressees, and users who may use the address retrieval system 200 to request address information, i.e. potential requesters, the addressee and requester nature of the users being interchangeable depending on their use/interaction with the address retrieval system 200 at a given time. The network node 240 can be a specific node, or network of nodes, on/connected to a network, such as a cellular phone network, and storing, containing or having access to the subscriber information 242. Alternatively, the network node 240 can be a subscriber database, or portion thereof, that is within/accessible to the address retrieval system 200. In an example, such as in a cellphone network, the network node 240 can be a Home Subscriber Server (HSS) on the network. The network node 240 can contain various information of each subscriber, such as their physical address 246 and a phone number 244, and/or can be a subscriber database, or portion thereof, containing similar information.

The query from the query module 220 can be transmitted to the network node to retrieve the requested physical address 246, using the personally identifiable information 244 contained in the request. The personally identifiable information 244 can be/function as an index to allow the associated physical address 246 of the addressee to be retrieved. Example personally identifiable information 244 can include a phone number, a name, an email address, a social media username, and/or other information substantially unique to the user associated with such information.

The physical address information 246 of the various users can be encrypted and/or protected to prevent unwanted/unauthorized access of/to the information. Additionally, or alternatively, the physical address information 246 can be stored so that it is not directly associated with a user; rather the information 246 can be associated with a representation of user, such as a randomly generated string of characters. The representation of the user can also be associated with the personally identifiable information 244 of the user, allowing the personally identifiable information 244 and physical address 246 of the user to be correlated without directly correlating or specifying a user with some or all of the information. Other data management and security techniques, implementations, systems and/or methods can be used to maintain the security/integrity of the subscriber information 242 and/or prevent/limit access to such information by unauthorized parties.

Address routing 250 can be used to provide the retrieved address information to a recipient other than the requester, such as a third party. Based on the request and/or privacy policy, the requester may or may not receive the retrieved address information. Instead, the address information can be indicated for transmission/provided to another party. Example third parties can include merchants, shipping services and/or other parties engaged by the requester to send a physical item to an address, or otherwise obtain the address of an addressee.

In another example, the address routing 250 can include transmitting/providing the retrieved address information to a device or other location. For example, the requester and/or privacy policy can cause the retrieved address information to be provided to a printer. The printer can then print a label containing the retrieved address information, which can then be used by the requester to properly address a package to the addressee.

In an embodiment, certain address information can be redacted from the printed address label, so that the addressee information accessible/viewable by the requester is limited. For example, the address information can be provided to the printer as a file that does not actually print the physical address, or a portion(s) thereof, on the address label. Rather, the physical address can be represented as a barcode or other visual indicia that are interpretable by a delivery service. In this manner, the address label contains the retrieved address information in a form that allows the package to be properly delivered; however, the physical address information is obscured from interpretation by a person, such as the requester, viewing the label. The obfuscation of information on the address label can be a default setting and/or a configurable setting, such as by a user in their privacy policy. This obfuscation can assist a user in preventing others from receiving their address information while providing the requisite information to allow a package, or other delivery, to be requested/sent by a requester to the addressee.

Figure 3:
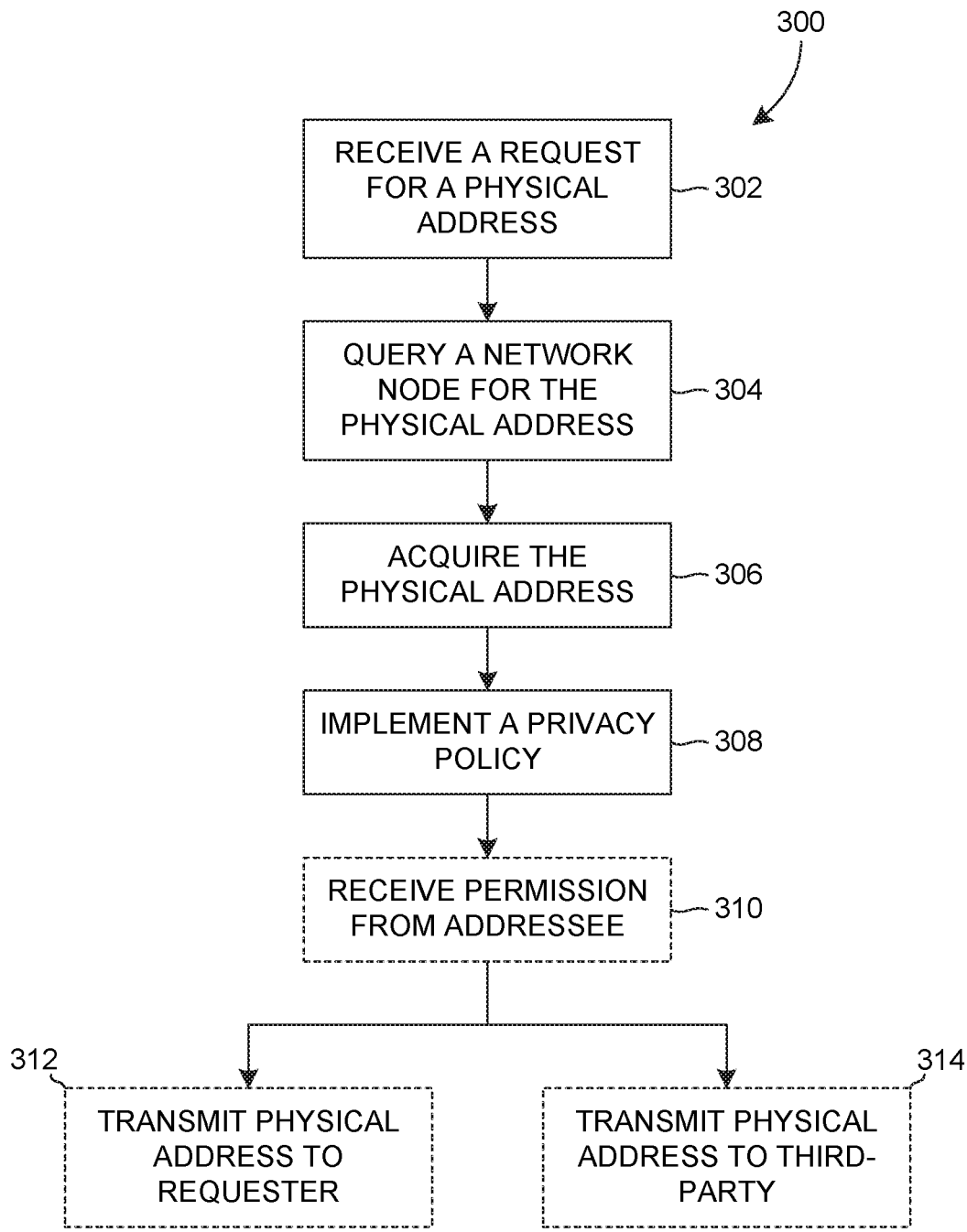
FIG. 3 illustrates an example method of an address retrieval.

FIG. 3 is an example method 300 of address retrieval using an address retrieval system, such as 200 of FIG. 2. At 302, a request for a physical address is received. The request includes at least a piece of personally identifiable information associated with a user, an addressee, for which the request is seeking physical address information. The request can also include information regarding the party/user (e.g., a requester) requesting the physical address information. At 304, a network node is queried for the physical address. The query includes the personally identifiable information of the request and is used to locate/retrieve the physical address information of the addressee. At 306, the physical address is acquired and at 308 a privacy policy is implemented/applied. As discussed above, the privacy policy can limit/restrict the retrieved address information and/or dissemination thereof. Various rules and/or permissions regarding the release of their address information can be configured by a user and stored/implemented as a privacy policy. The privacy policy associated with the acquired physical address is applied to determine if the information can be released and if any restrictions need to be applied to the release of the information, such as limiting the recipients of the information.

At 310, optionally, permission from an addressee can be received to allow the physical address information to be supplied to one or more recipients, such as the requester and/or a third party. A request for permission can be communicated to the addressee, such as a notification on their user device, and the addressee can view details of the request, edit/modify the retrieved address information and/or provide permission or deny permission for their address information to be provided/transmitted to the recipients. At 312 and 314, the physical address information can be transmitted to the requester and/or a third party. Transmission of the physical address to one or more recipients can be based on the request received at 302, the privacy policy implemented at 308 and/or, optionally, the addressee permission received at 310. In the method 300, there are various checks to allow users to limit the release of their address information due to the personal nature and/or security concerns associated with the dissemination of such information. These checks are implemented at multiple points to assist in limiting errors that can cause information to be released in an unwanted and/or unauthorized manner.

Figure 4:
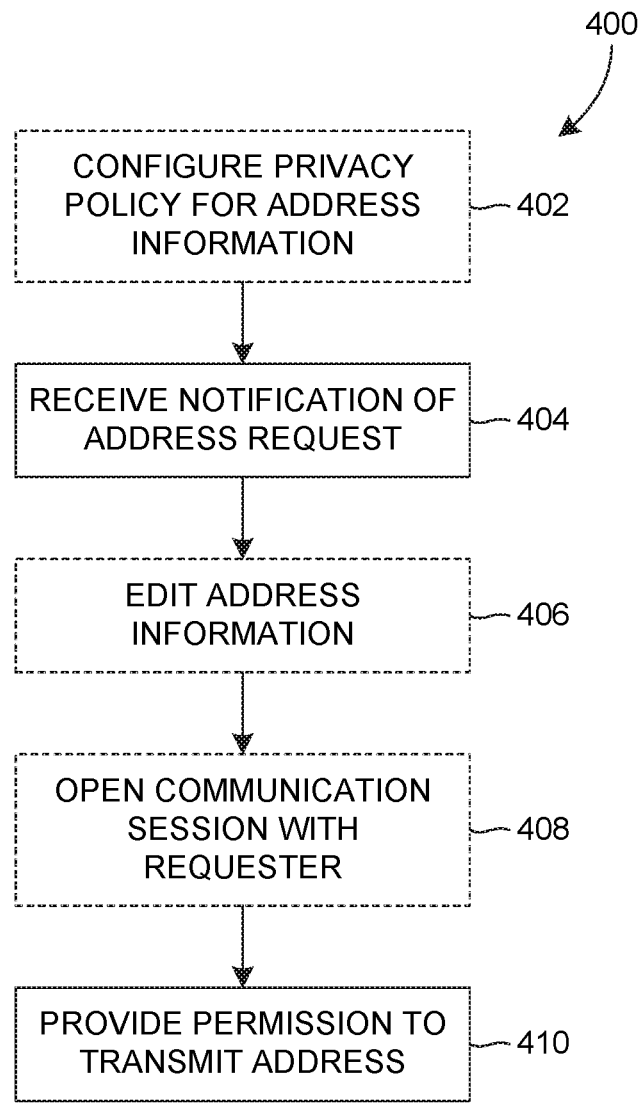
FIG. 4 illustrates an example method of permitting an address retrieval.

FIG. 4 is an example method 400 of permitting an address retrieval by a user, such as an addressee. At 402, a user can optionally configure a privacy policy for their address information, such as their address information associated with/accessible by an address retrieval system, such as 200 of FIG. 2. The user can be provided multiple tools, options, configurations and/or choices to create/manage permissions/rules governing the release of their address information. As discussed above, the user can have one or more privacy policies associated with one or more addresses and/or one or more pieces of personally identifiable information associated with the user. Additionally, or alternatively, the user's privacy policy can be tiered based on various criteria, such as the personally identifiable information included in the request, and the release of the user's physical address information, forms and/or portions thereof, can be associated with one or more of the tiers outlined/defined in the privacy policy.

At 404, the user can receive a notification of an address request. The notification can include various information, such as information regarding the requester, information supplied in the request, an indication of an item being shipped to the addressee and/or other information regarding the request. The identification of the requester can indicate if the request is from another user or a third party, such as a shipping service or merchant. Such an indication can provide the addressee insight and help them make a decision regarding the release of their address information. At 406, the addressee can be presented an opportunity to modify the retrieved address information. For example, the addressee can correct errors in the retrieved address information or provide a different physical address, such as a commercial delivery location. If the user edits the retrieved address information, they can be asked if they would like to have the edit applied to the source from which their address information was retrieved. In this manner, the user can request their address information be updated, such as updating a billing address. Additionally, the notification can include information regarding the recipients of the address information and the addressee can be offered an opportunity to edit/modify the recipients, such as removing one or more recipients from those who will receive the address information of the addressee.

At 408, optionally, the addressee can open a communication session with the requester. The communication session can include verbal, visual and/or textual communication. This can allow the addressee to acquire additional information regarding the requester and/or their purpose of the request. At 410, the addressee can provide their permission to allow their address information to be transmitted to one or more recipients, such as the requester or a third party. In an example, the notification received by the addressee at 404 can include an input, such as a selectable icon, that the addressee can interact with to provide their permission to allow their address information to be transmitted to one or more recipients.

Figure 5:
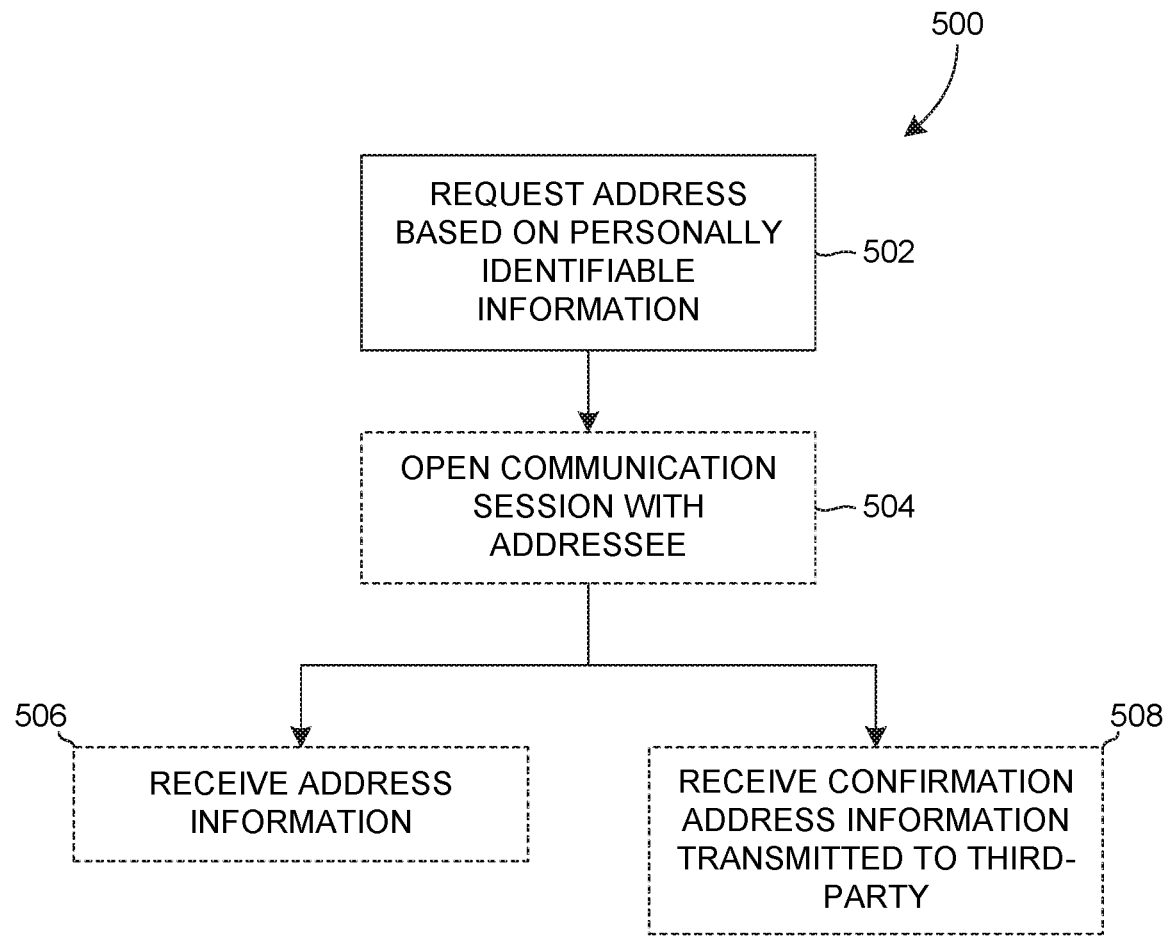
FIG. 5 illustrates an example method of requesting an address.

FIG. 5 is an example method 500 of requesting an address, such as by a requester interacting with an address retrieval system. At 502, a user, the requester, can request an address based on personally identifiable information they provide. In an example, the user can interact with an application or portal, such as a webpage, on/with a user device to perform/prepare the request. The user needs to provide personally identifiable information associated with the person, addressee, they are seeking the address of. Such information can include a phone number, email address, social media username, and/or other information regarding the addressee.

At 504, the requester can optionally open a communication session with the addressee. The requester can initiate the communication sessions to provide identification and/or verification to the addressee, such as their intentions/cause for the request for the addressee's address information. At 506 and 508, the address information can be received by the requester and/or by a third party. Reception of the address information can be based on one or more factors, such as a recipient contained within the request and/or a privacy policy that manages/governs the release of the addressee's address information.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be used for realizing the invention in diverse forms thereof.

The invention claimed is:

1. An address retrieval system, comprising:
a processor comprising:
   a request module configured to receive a request for a physical address of an addressee, the request including a piece of personally identifiable information associated with the addressee,
   a query module configured to generate a query based on the request, and
   in response to the query, a privacy module configured to:
      retrieve a privacy policy from a user device of the addressee, the privacy policy being configurable by the addressee and having one or more permissions related to allowing or limiting transmission of the physical address of the addressee, and apply the privacy policy to at least one of the query or a transmission of the physical address of the addressee transmitted in response to the query; and a storage device including addressee information, the addressee information including a physical address-personally identifiable information correlation, the storage device configured to receive the query and to allow transmission of or limit transmission of the physical address associated with the personally identifiable information of the query based on the applied privacy policy, wherein the privacy policy causes the address retrieval system to communicate with a user device of the addressee, the communication determining if a requestor is a contact of the user device of the addressee.

2. The address retrieval system of claim 1, wherein the privacy module is further configured to cause a notification of the request to be sent to the addressee.

3. The address retrieval system of claim 2, wherein the notification includes a selectable input that, when selected, communicates a permission to the privacy module to allow the transmission of the physical address information of the addressee.

4. The address retrieval system of claim 1, wherein the privacy policy causes the address retrieval system to transmit the physical address to a party other than the requester.

5. The address retrieval system of claim 1, wherein the physical address is transmitted to a party other than the requester requesting the physical address of the addressee.

6. The address retrieval system of claim 1, wherein the storage device is on or in communication with a first network and does not include the physical address of the addressee, and wherein the query includes at least one of a permission or encoding configured to allow the query to be provided to a second network having the physical address of the addressee and to cause the physical address of the addressee to be one of transmitted by or retrieved from the second network.

7. The address retrieval system of claim 1, wherein the storage device is a network node, the network node being a Home Subscriber Server (HSS).

8. The address retrieval system of claim 1, wherein the privacy policy is one of a plurality of privacy policies, and wherein the storage device further comprises a privacy policy database configured to store the plurality of privacy policies, and wherein the privacy policy is configured to be retrieved from the plurality of privacy policies based on at least one of the request or query.

9. The address retrieval system of claim 1, wherein the privacy policy is one of a plurality of privacy policies and the privacy policy is configured to be retrieved from the plurality of privacy policies based at least on one of the request or the query.

10. The address retrieval system of claim 1, wherein the addressee is a subscriber of a service provider network including the processor and the storage device.

11. A method of address retrieval, comprising:
receiving a request for a physical address of an addressee, the request including personally identifiable information associated with the addressee;
querying a storage device for the physical address of the addressee based on the personally identifiable information of the request;
acquiring, from the storage device, the physical address; and
in response to one or both of acquiring the physical address the querying the network node for the physical address:
retrieving a privacy policy from a user device of the addressee, the privacy policy being configurable by the addressee and having one or more permissions related to allowing or limiting transmission of the physical address of the addressee, and
applying the privacy policy to one of the acquired physical address or the query, the privacy policy configured to at least one of allow, limit, or deny a transmission of the physical address,
wherein the privacy policy causes an address retrieval system to communicate with a user device of a requester or the user device of the addressee, the communication determining if the requester or the addressee is a contact of the user device of the other party.

12. The method of claim 11, further comprising transmitting a notification of the request to the addressee based on the privacy policy.

13. The method of claim 12, wherein the notification is transmitted based on the retrieval of the privacy policy and prior to the applying the privacy policy.

14. The method of claim 12, wherein the notification includes a selectable confirmation configured to allow the transmission of the physical address, and wherein the one or both of the transmitting or limiting the transmission of, respectively, the physical address occurs in response to the receiving the selectable confirmation to allow transmission of the physical address.

15. The method of claim 12, wherein the notification includes an ability to establish a communication session between a first user device of the addressee and a second user device of a requester that supplied the request, the communication session configured to allow the addressee and the requester to communicate.

16. The method of claim 12, wherein the notification includes the acquired physical address, and further comprising allowing the addressee to modify the acquired physical address before the physical address is transmitted.

17. The method of claim 11, wherein transmitting the physical address includes transmitting the physical address to a user device associated with the requester.

18. The method of claim 11, wherein transmitting the physical address includes transmitting the physical address to a third party based at least on one of the request or the privacy policy.

19. An address retrieval system, comprising:
a processor comprising:
a request module configured to receive a request for a physical address of an addressee, the request including at least a piece of personally identifiable information associated with the addressee,
a query module configured to generate a query based on the request, and in response to the query, a privacy module configured to:
retrieve a privacy policy from a user device of the addressee, the privacy policy being configurable by the addressee and having one or more permissions related to allowing or limiting transmission of the physical address of the addressee, and apply the privacy policy to at least one of the query or a transmission of the physical address of the addressee transmitted in response to the query; and a storage device including addressee information, the addressee information including a physical address-personally identifiable information correlation, the storage device configured to receive the query and to allow transmission of or limit transmission of the physical address associated with the personally identifiable information of the query based on the applied privacy policy, wherein the privacy policy causes the address retrieval system to communicate with a user device of a requester or the user device of the addressee, the communication determining if the requester or the addressee is a contact of the user device of the other party.

20. The address retrieval system of claim 19, wherein the privacy module is further configured to cause a notification of the request to be sent to the addressee, and wherein the notification includes a selectable input that, when selected, communicates a permission to the privacy module to allow the transmission of the physical address information of the addressee.

21. The address retrieval system of claim 19, wherein the privacy policy causes the address retrieval system to transmit the physical address to the party other than the requester.

* * * * *